United States Patent [19]

Haland et al.

[11] Patent Number: 5,112,079
[45] Date of Patent: May 12, 1992

[54] ARRANGEMENT FOR PROTECTING AN OCCUPANT OF A VEHICLE

[75] Inventors: Lars Y. Haland, Falsterbo; Enar T. Skanberg, Billdal, both of Sweden

[73] Assignee: General Engineering (Netherlands) B.V., Utrecht, Netherlands

[21] Appl. No.: 531,394

[22] Filed: Jun. 1, 1990

[30] Foreign Application Priority Data

Jun. 13, 1989 [GB] United Kingdom ............... 8913563

[51] Int. Cl.⁵ .............................................. B60R 21/22
[52] U.S. Cl. ..................................... 280/730; 297/464
[58] Field of Search ............... 280/730, 728, 734, 735; 297/464; 180/274

[56] References Cited

U.S. PATENT DOCUMENTS

| | | | |
|---|---|---|---|
| 3,617,073 | 11/1971 | Landsmann et al. | 280/730 |
| 3,981,520 | 9/1976 | Pulling | 280/730 |
| 4,946,191 | 8/1990 | Putsch | 280/730 |
| 4,966,388 | 10/1990 | Warner et al. | 280/730 |

FOREIGN PATENT DOCUMENTS

| | | | |
|---|---|---|---|
| 2249988 | 10/1972 | Fed. Rep. of Germany | 280/730 |
| 2841729 | 4/1980 | Fed. Rep. of Germany | 280/730 |
| 3741637 | 6/1989 | Fed. Rep. of Germany | . |
| 1299050 | 12/1972 | United Kingdom | . |
| 1313220 | 4/1973 | United Kingdom | . |
| 1381999 | 1/1975 | United Kingdom | . |
| 1450666 | 9/1976 | United Kingdom | . |
| 2220620 | 1/1990 | United Kingdom | 280/730 |

Primary Examiner—Charles A. Marmor
Assistant Examiner—Karin Tyson
Attorney, Agent, or Firm—Spencer, Frank & Schneider

[57] ABSTRACT

An inflatable bag is provided to protect an occupant of a motor vehicle. The bag is mounted within the structure of a seat of a vehicle and, when inflated, the bag is located between the occupant of the vehicle sitting on that seat and the side of the vehicle, with the center of that part of the bag which contacts the occupant of the vehicle being substantially aligned with the center of gravity of the torso of that occupant.

10 Claims, 2 Drawing Sheets

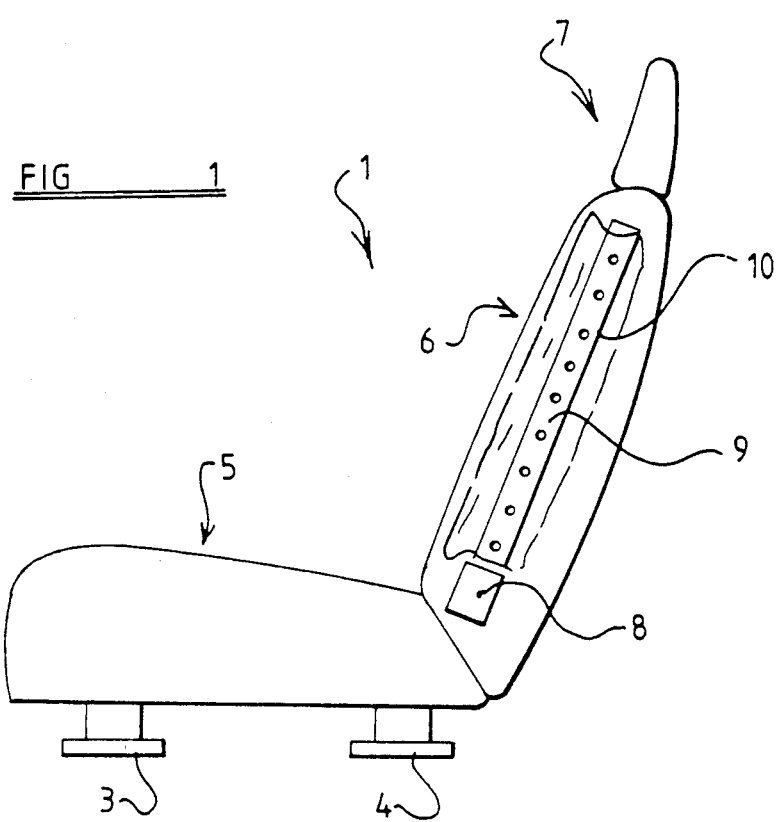
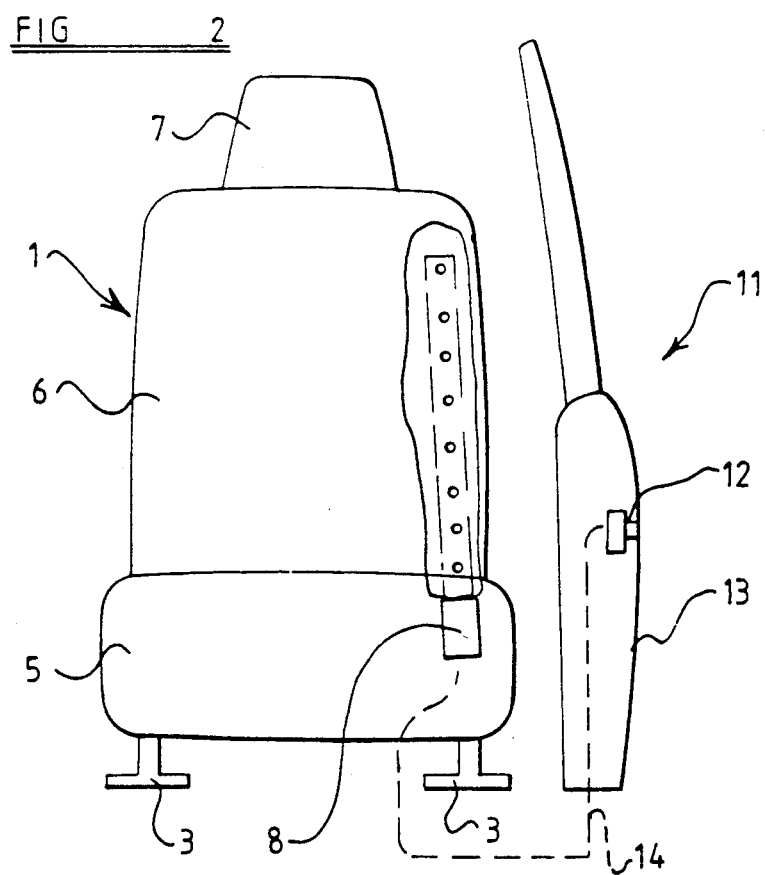

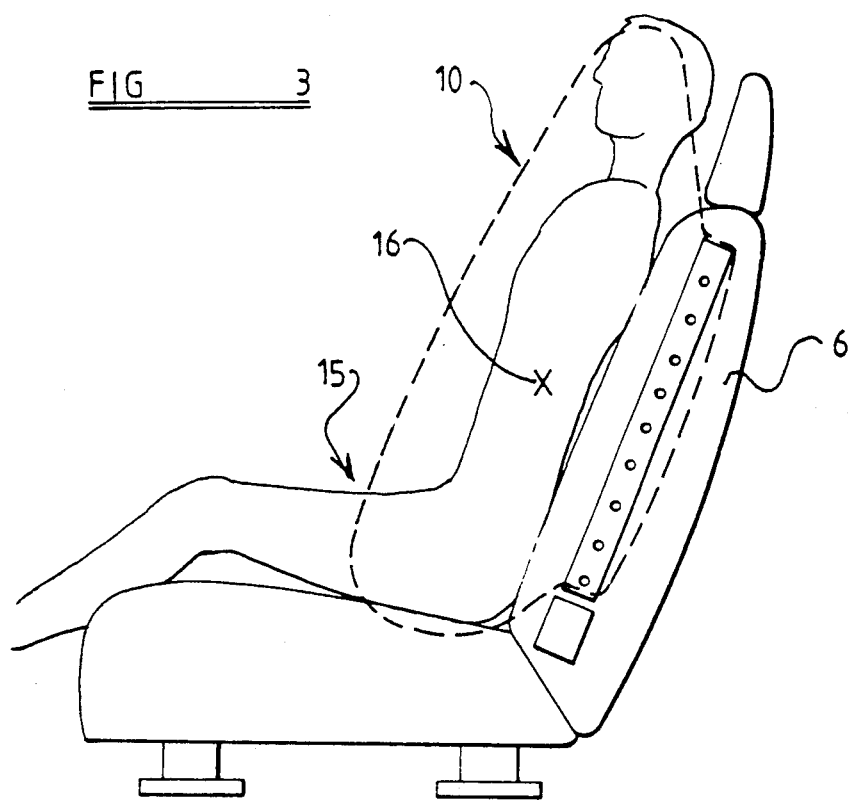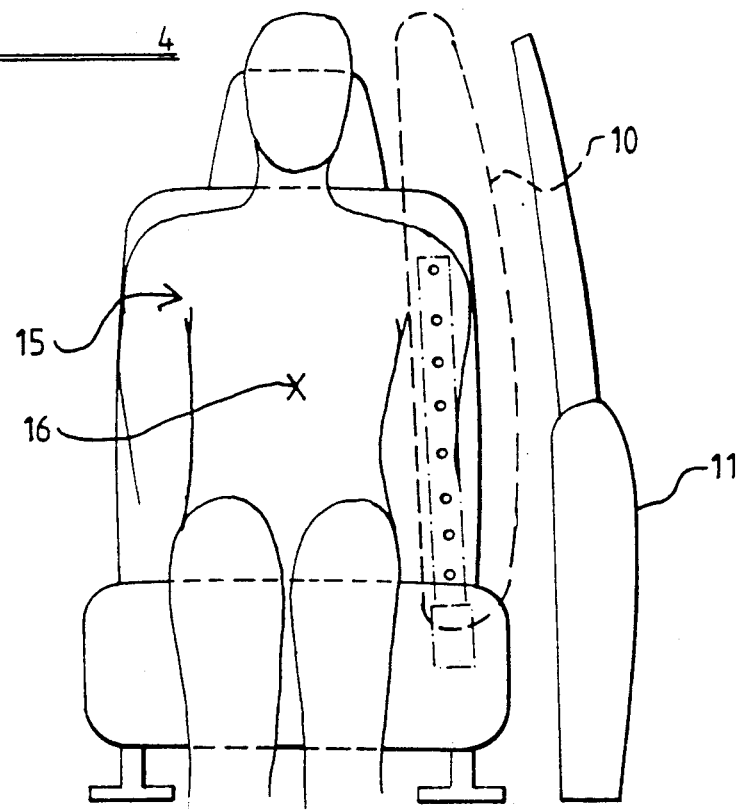

ARRANGEMENT FOR PROTECTING AN OCCUPANT OF A VEHICLE

BACKGROUND OF THE INVENTION

This invention relates to an arrangement for protecting an occupant of a vehicle and more particularly relates to such an arrangement which incorporates an inflatable bag, commonly termed an "air bag".

It has been proposed previously to provide one or more inflatable bags within a motor vehicle, arranged to be inflated in the event of an accident, in order to provide a degree of protection for an occupant of the vehicle.

It has been proposed previously to mount such an inflatable bag on the side of the vehicle, in order to provide a degree of protection to the occupant of the vehicle in the event of a side impact occurring. An example of such an arrangement is shown in British Patent Specification 1,381,999.

It is to be appreciated that the occupant of a vehicle is normally seated upon a seat which can be adjusted, forwardly and backwardly, within the vehicle. Thus the bag must be designed and located to provide protection when inflated regardless of the particular adjustment of the seat. Consequently the bag, when inflated must extend over a significant length of the vehicle, and must be designed to provide the required degree of protection regardless of the actual position of the occupant of the vehicle. This does provide a constraint upon the designer of the inflatable bag.

OBJECT OF THE INVENTION

The present invention seeks to provide an improved arrangement for protecting an occupant of a vehicle.

SUMMARY OF THE INVENTION

According to this invention there is provided an arrangement to protect an occupant of a motor vehicle, the arrangement comprising an inflatable bag, and gas generator means to inflate the bag, the bag being mounted in position so that, when inflated, the bag is located between the occupant of the vehicle sitting on a seat, and a side of the vehicle, with the centre of that part of the bag which contacts the occupant of the vehicle being substantially aligned with the centre of gravity of the torso of that occupant, and the bag, when in its uninflated form, being mounted within the structure of the seat.

Preferably, the bag is mounted within the back of the seat.

Conveniently, means are provided to trigger inflation of the bag, said means being responsive to a side impact on the vehicle.

Advantageously, the means responsive to a side impact of the vehicle are responsive to deformation of the outer skin of the side of the vehicle.

Preferably, the means responsive to deformation of the side wall of a vehicle generate an electric hydraulic, pneumatic, or mechanical signal provided to a trigger in the gas generator associated with the bag.

Conveniently, the gas generator of the bag is located adjacent the base of the back of the seat.

Preferably, the bag when inflated, is adapted to occupy a space between an occupant of the vehicle sitting on the seat and the adjacent side of the seat, the bag thus occupying a space to one side of and immediately in front of the back of the seat.

Preferably the seat is covered by a fabric so located that the fabric will be torn by the bag when the bag is inflated.

BRIEF DESCRIPTION TO THE DRAWINGS

FIG. 1 is a side view of a seat to be mounted in a motor vehicle, with parts thereof cut-away, illustrating one embodiment of the invention:

FIG. 2 is a front view of the seat of FIG. 1, again with parts thereof cut-away, illustrating an adjacent door forming part of the vehicle;

FIG. 3 is a view corresponding to FIG. 1 illustrating an occupant of the vehicle and illustrating the extent of an inflatable bag forming part of the arrangement of the invention when inflated; and FIG. 4 is a view corresponding to FIG. 2, but again illustrating the occupant of the vehicle and indicating the extent of the inflatable bag when inflated.

DESCRIPTION OF THE PREFERRED EMBODIMENT

Referring initially to FIG. 1 of the drawing, a seat 1 for a motor vehicle is illustrated, the seat being a front seat. The seat is mounted on shoes 3, 4 which can engage a rail to permit the position of the seat to be adjusted forwardly and backwardly.

The seat comprises a squab 5 and a back 6, the back of the seat being provided with an integral head restraint 7.

Mounted within the back of the seat, adjacent the outside edge of the back of the seat, is a gas generator 8 associated with a perforated tube 9 which extends through a bag 10 which is a so-called "air bag". The gas generator 8 is located at the bottom of the back of the seat, and the tube 9 extends upwardly. The bag 10 is thus just behind the fabric covering the back of the seat.

As can be seen from FIG. 2, the seat 1 is located adjacent a door 11 of the motor vehicle. Mounted within the door is a sensor 12 adapted to sense a side impact. The sensor may be mounted within the door to respond to a deformation of the outer skin 13 of the door. Thus the sensor may be a hydraulic arrangement adapted to operate a switch in response to a rise in hydraulic pressure or may be an arrangement which incorporates a piezo electric element which provides an output signal when pressure is applied to the piezo electric element in response to deformation of the outer skin 13 of the door 11, or may simply be a membrane switch. The sensor 12 is connected by an electric lead 14 to a triggering mechanism contained within the gas generator 8.

It is to be appreciated that the gas generator 8, the tube 9 and the air bag 10 are initially totally concealed within the back 6 of the seat 1.

In the event of an accident arising, which involves the side impact, and which thus causes the outer skin 13 of the door 11 to be deformed, an appropriate triggering signal is sent from the sensor 12, through the lead 14, to the gas generator 8. As a result, gas is generated by the gas generator 8 and passes through the apertured tube 9 into the air bag 10. The air bag 10 is thus rapidly inflated. The air bag 10 bursts out of the side of the back 6 of the seat 1, tearing or ripping the material covering the back of the seat. The bag is designed, so that when it is inflated it is located adjacent the side 6 of the seat, but forwardly of the side 6 of the seat. As can be seen from FIGS. 3 and 4 the bag is located adjacent the side of an occupant 15 of the vehicle sitting upon the seat 1, between the occupant of the vehicle and the door 11.

It is to be noted that the centre of the bag 10 is substantially aligned with the centre of gravity 16 of the main torso of the occupant 15 of the vehicle. This arrangement helps to ensure that, in the event of a side impact arising, the occupant of the vehicle is restrained. If the centre of gravity of the torso were not substantially co-aligned with the centre of the bag, it is possible that the bag, as it inflates, will contact the occupant of the vehicle, applying a rotational motion to the occupant of the vehicle, which would clearly be undesirable.

Preferably the inflated bag 10 should cover the area between the hip and the shoulder of the occupant of the vehicle, and may also extend to cover the region adjacent the head of the occupant of the vehicle.

It is to be noted that in the described embodiment of the invention the gas generator 8 is located at the bottom of the apertured tube 9, and is thus located adjacent the squab 5 of the seat of the vehicle. Consequently the gas generator 8 is located as far as practicable away from the ears of the occupant of the vehicle. It is to be appreciated that when a gas generator inflates an air bag, as described, a considerable noise is generated. If this noise is generated very close to the ears of the occupant of the vehicle, the ears of the occupant can be permanently damaged.

It is to be appreciated that since the inflatable bag 10 is actually mounted on the seat of the vehicle, regardless of the actual position of the seat of the vehicle relative to the car, the bag, when inflated, will always have precisely the desired position with regard to the occupant 15 of the vehicle sitting upon the seat 1. Thus, if the seat is in its forwardmost position, the bag 10 when inflated will be located precisely between the occupant 15 of the vehicle and the door 11, and if the seat is in its rearmost position the bag 10 when inflated will again be located precisely between the occupant 15 of the vehicle and the door 11. Thus the air bag may be made to have a minimum size and need not have an overlarge extent in the longitudinal direction of the vehicle.

Whilst the invention has been described with reference to one embodiment it is to be appreciated that many modifications may be effected without departing from the scope of the invention as defined by the following claims.

What is claimed is:

1. An arrangement to protect an occupant of a motor vehicle, the arrangement comprising a seat including a squab and a back, an inflatable bag, gas generator means to inflate the bag, and a diffuser fluidly connected with said gas generator means, said diffuser extending substantially the length of said back and having a plurality of openings fluidly connected with said bag, the bag having an uninflated form and an inflated form, said inflated form being when said gas generator means inflates said bag and being larger than said uninflated form, the bag, when in its uninflated form, being mounted within the structure of said seat, the bag being mounted in position and configurated for causing the inflated form of the bag to be located between an occupant of the vehicle sitting on the seat, and a side of the vehicle when the bag is inflated by the gas generator means, the inflated form of the bag extending from at least the squab of the seat to the top of the back of the seat, the centre of the inflated form of the bag contacting the occupant of the vehicle and being substantially aligned with the centre of gravity of the torso of the occupant when an occupant is seated on the vehicle seat.

2. An arrangement according to claim 1, wherein the seat back comprises a head restraint, and the inflated form of the bag extends to the top of the head restraint.

3. An arrangement according to claim 1, wherein the bag is mounted within the back of the seat, the bag being configured to emerge from a side part of the back of the seat when the bag is inflated by said gas generator means into its inflated form.

4. An arrangement according to claim 1, wherein the bag is mounted within the back of the seat.

5. An arrangement according to claim 1, wherein means are provided to trigger inflation of the bag, said means being responsive to a side impact on the vehicle.

6. An arrangement according to claim 5, wherein the means responsive to a side impact on the vehicle is responsive to deformation of the outer skin of the side of a vehicle.

7. An arrangement according to claim 6, in which the means responsive to deformation of the outer skin of a vehicle generates an electric, hydraulic, pneumatic, or mechanical signal, provided to a trigger in the gas generator associated with the bag.

8. An arrangement according to claim 1, wherein the gas generator of the bag is located adjacent the base of the back of the seat.

9. An arrangement according to claim 1, wherein the inflated form of the bag is configured to occupy a space between an occupant of the vehicle sitting on the seat and the adjacent side of the seat, the inflated form of the bag thus occupying a space to one side of and immediately in front of the back of the seat.

10. An arrangement according to claim 1, wherein the seat is covered by a fabric, said fabric being torn by the bag when the bag is in its inflated form.

* * * * *